United States Patent

Wörz

[11] 4,028,027
[45] June 7, 1977

[54] SCREW HOUSING FOR A SCREW MACHINE

[75] Inventor: Wolfgang Wörz, Illingen, Germany

[73] Assignee: Werner & Pfleiderer, Stuttgart, Germany

[22] Filed: May 9, 1975

[21] Appl. No.: 576,019

[30] Foreign Application Priority Data

May 16, 1974 Germany ............................ 2423785

[52] U.S. Cl. ................................ 418/201; 100/146; 259/192; 425/204

[51] Int. Cl.[2] ...................... F01C 21/10; B30B 3/00; B29B 1/10

[58] Field of Search .......... 418/205, 206, 201, 202, 418/203; 417/900; 425/204, 376 R, 192; 259/192, 9; 100/146, 127

[56] References Cited

UNITED STATES PATENTS

| 2,543,307 | 2/1951 | Swallow et al. | 259/192 |
| 3,268,949 | 8/1966 | Schmidt et al. | 415/219 X |
| 3,277,529 | 10/1966 | Linder | 425/461 |
| 3,529,541 | 9/1970 | Ward | 100/145 X |
| 3,590,429 | 7/1971 | Bammert et al. | 425/192 |
| 3,696,736 | 10/1972 | Studli | 425/204 X |
| 3,970,113 | 7/1976 | Güttinger et al. | 138/157 |

Primary Examiner—Carlton R. Croyle
Assistant Examiner—Leonard Smith
Attorney, Agent, or Firm—Browdy and Neimark

[57] ABSTRACT

A screw housing with a wearing insert for a two-shafted screw machine wherein the wearing insert has two spaced parallel bores to accommodate screw shafts located with their mutually parallel longitudinal axes in the principal plane of symmetry of the wearing insert. These shafts are spaced apart so as to form saddles at the connecting point of the bores. The insert housing has an external cross-section which is substantially constant along its axial length and is arranged in a cavity of the screw housing having the same cross-section.

10 Claims, 8 Drawing Figures

SCREW HOUSING FOR A SCREW MACHINE

FIELD OF THE INVENTION

This invention relates to a screw housing with a wearing insert for a two-shafted screw machine.

BACKGROUND OF THE INVENTION

Such screw machines are used mainly as double screw extrusion presses or double-screw injection molding or casting machines. Such a wear insert which is known from U.S. Pat. No. 3,268,949 comprises two bushes shaped as sectors of a cylindrical ring and two clamping bars forming the saddles which are tightened in corresponding longitudinal grooves in the screw housing in such a manner that the bushes are pressed against the interior walls of the cavity in the screw housing simultaneously. The cost of manufacturing this multi-part wear insert and the production of the corresponding internal shape of the cavity in the screw housing is quite high. Moreover, there remains between the bars forming the saddle, and the bushes, several gaps through which corrosive gases or liquid contained in the material to be processed can penetrate leading to damage to the interior wall of the cavity in the screw housing. In this way, the surface contact, particularly in the region of the saddle, between the wear insert and the screw housing is reduced which leads in time to poor and non-uniform heat transmission between the insert and the screw housing and thus to distortion of the wear insert. Futhermore, the bushes are initially distorted out of the arcuate cross-section by the clamping forces applied thereto.

It is already known to form the cavity in the screw housing with a larger cross-section than which corresponds to the external cross-section of the wearing insert and to fill this residual space with a castable material, the melting point of which is lower than the melting point of the material of the wearing insert and than the melting point of the housing material. A good heat transfer from the wearing sleeve to the screw housing and a largely distortion-free seat is in fact achieved by this means but the manufacture is complicated and costly. Furthermore the work outlay required to exchange a worn wearing insert is high.

It is also known to manufacture a wearing insert from two tubes welded together at their chamfered joint surfaces, while these tubes have externally along the joints, notchings which alternate with flattened surfaces, and while the welds connecting the tubes are arranged solely in the region of the notchings. It is intended to achieve by this means that very close tolerances can be observed during the manufacture of the wearing insert, so that the joint surfaces are in such snug mutual contact that so far as possible no material processed in the screw machine, such as e.g., plastics, penetrates between the joint surfaces. However, such joint surfaces have the disadvantage that they corrode due to penetrating aggressive gas or condensate from the plastics melt. In a particularly disadvantageous manner, these joint surfaces simultaneously constitute the most heavily stressed point, namely the saddle point of the wearing insert, and therefore tend readily to fracture. Futhermore, in this case, firstly complicated manufacture of the wearing insert and secondly complicated exchange of such a wearing insert are obtained. Futhermore, here again a full surface contact of the wearing insert in the cavity of the screw housing is not ensured. A wearing insert of practically identical construction is known from U.S. Pat. No. 3,010,151, to which the above remarks apply.

SUMMARY OF THE INVENTION

It is the underlying aim of the invention to produce a screw housing with a wearing insert of the type initially referred to, for which a simple dimensionally accurate manufacture of the cavity of the screw housing and of the external circumference of the wearing insert and hence an accurate surface contact between wearing insert and screw housing, and in the case of extremely hard materials being used for the wearing insert with simultaneously simple exchangeability of the wearing insert, is possible in an economic manner.

According to the invention there is provided a screw housing with a wearing insert for a two-shafted screw machine, wherein the wearing insert has two spaced parallel bores to accomodate respective screw shafts, the mutually parallel longitudinal axes of the shafts being in the principal plane of symmetry of the wearing insert, and being spaced apart to form saddles between the bores. The insert has a substantially constant external cross-section along its length and is arranged in a cavity of the same cross-section in the screw housing.

The external cross-section of the wearing insert is bounded exclusively by convex or by convex and straight curves, while no angles are present in the curves in the region of the saddles, i.e., no acute angles or other sudden changes in direction or shape of the curves are present which would form stress concentration points. Due to this formation, the wearing insert acquires an external cross-section which can be machined completely around on its external surface in an extremely simple manner, which is not the case with the known wearing inserts. But this has the consequence that the external cross-section can be manufactured to have extremely accurate dimensions with the result that an extremely accurate surface contact between the housing and the insert, and hence a good heat transfer, is also ensured. This leads to a considerable reduction of heat stresses with a corresponding reduction of the risk of distortion. This results in reduced wear and reduced risk of saddle fractures.

The wearing insert constructed according to the invention can be manufactured to accurate dimensions even if it is welded together from a plurality of parts, because the external shape can be machined subsequently in a simple manner, It is also considerably reinforced precisely at the most sensitive point, namely the saddles, so that the risk of fracture at this particular point is greatly reduced. Owing to the possibility of simple and dimensionally accurate machining of its entire external shape it is also exchangeable in simple manner and more particularly no specific adaptation of a wearing insert to a housing is necessary, so that the stockholding of replacement wearing inserts is also simplified.

According to a particularly advantageous embodiment of the invention, such a wearing insert is constituted so that the external cross-section is bounded by two semi-circles located with their respective centers on the longitudinal axes of the bores and two straight lines connecting these semicircles tangetially. Such an external shape can be manufactured with great accuracy using conventional production methods.

In a further advantageous embodiment of the invention, the wearing insert has an external cross-section which is formed by two circular segments in mutual contact by their secants, of equal radius and equal center angle, while the center angle $a$ is less than 180°. This wearing insert can be manufactured in a simple manner merely by turning or circular grinding, which can likewise be performed fairly economically and with an extraordinarily high dimensional accuracy.

Re-machining of the housing after an exchange of the wearing insert is unnecessary with all the embodiments according to the invention. Even if the screw housing becomes damaged, for example, by chemical influences or by the wearing insert wearing through to the housing, a re-machining of the cavity of the screw housing is easily possible. Furthermore, due to the fact that the wearing insert is not divided at the saddle position, it is more mechanically stable at the point, But in addition, the saddle position can also be more strongly flattened than could hitherto be the case for the manufacture from two bimetallic tubes. By this means also, a premature wearing or a fracture of the saddle point can be effectively prevented. Due to the shape of the wearing insert, it is firmly and completely positioned tangentially in the screw housing, so that the torque of the screws which occurs during service is transmitted to the housing without additional keys or similar measures. Due to the very samll temperature differences between the wearing insert and the screw housing, even extremely hard materials can be used for the wearing insert. Furthermore, the wearing insert can be installed into the screw housing with extremely low pre-stressing.

In the case of the last described embodiment, it is convenient for the distance $x$ of the centers of the circular arcs outwardly bounding the circular segments from the median longitudinal plane formed by the longitudinal axes of the screw bores to be defined by the expression $Di \geq x \geq Di/7$, where $Di$ is the inside diameter of the screw bores. It is further convenient in this case for the length $S$ of the secants to be defined by the expression $3\ Di \geq S \geq 1.7\ Di$, where $Di$ is the inside diameter of the screw bores. These limits for the lengths of the secants and for the distance of the centers of the circular arcs outwardly bounding the circular sections from the median longitudinal plane determine a shape of the wearing insert with which on the one hand, relatively small wall thicknesses, and on the other hand relatively small differences in wall thicknesses of the wearing insert are achieved.

According to a further advantageous feature of the invention, the housing is divided in its median longitudinal plane coincident with the principal plane of symmetry of the wearing insert and the two housing sections are connected detachably together. In this case the wearing insert need only be inserted into the cavity of the opened screw housing. Dut to the division of the screw housing, not only a simple exchange of the wearing insert, but also an easy and rapid cleaning in the case of a change of color, and a cleaning at the end of a work operation can be achieved, which is important more particularly for the processing of duroplasts. Furthermore, with the divided construction of the housing a simple control of the pre-stressing between housing and wearing insert is possible, as the width of the gap between the housing sections is a measure of the pre-stressing. If this gap is too great in the unstressed condition of the housing sections of the screw housing, then metal foils or shims may be laid upon the joint surfaces to compensate it, i.e., re-machining is unnecessary. An even more rapid exchange or removal of the wearing insert is possible if the housing sections are pivotably connected together.

According to a further advantageous feature of the invention, the wearing insert is detachably connected to the wall of the cavity by means of fixing screws in the secondary plane of symmetry oriented at right-angles to its principle plane of symmetry. These fixing screws attaching the wearing insert in the region of the saddle, and acting as tie rods, ensure an elastically clamping connection between housing and wearing insert, which is important more particularly during cyclic temperature stresses until temperature equalization, in order to prevent damage.

BRIEF DESCRIPTION OF THE DRAWINGS

The present invention will now be described by way of example with reference to the accompanying drawing, wherein:-

DETAILED DESCRIPTION OF A PREFERRED EMBODIMENT

Figure 1:
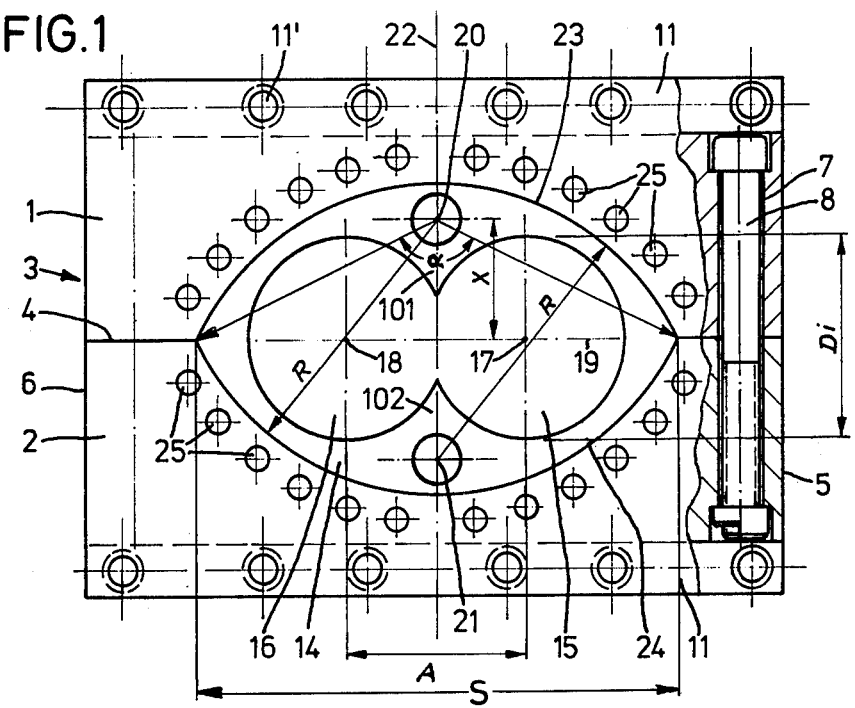
FIG. 1 is a partly sectional transverse view of a screw housing with a wearing insert according to the invention.

In the embodiments illustrated in FIGS. 1 to 6, a screw housing 3 of a two-shafted screw extruder is provided, comprising a housing top section 1 and a housing bottom section 2. This screw housing 3 is divided in its horizontal median longitudinal plane 4. The housing top and bottom sections 1 and 2, in mutual contact in this division plane, are screwed firmly but detachably together in the region of their external longitudinal sides 5 and 6 by means of tie rods 8 guided in corresponding bores 7. The external shape of the screw housing 3 is approximately parallelepipedic.

The housing 3 at each of its two cross-sectional ends 9 and 10 has flanges 11 projecting upwards and downwards respectively with bores 11' for connection to further housing sections — not shown — by means of screw connecting means to provide a longer passage for the screw extruder.

Figure 2:
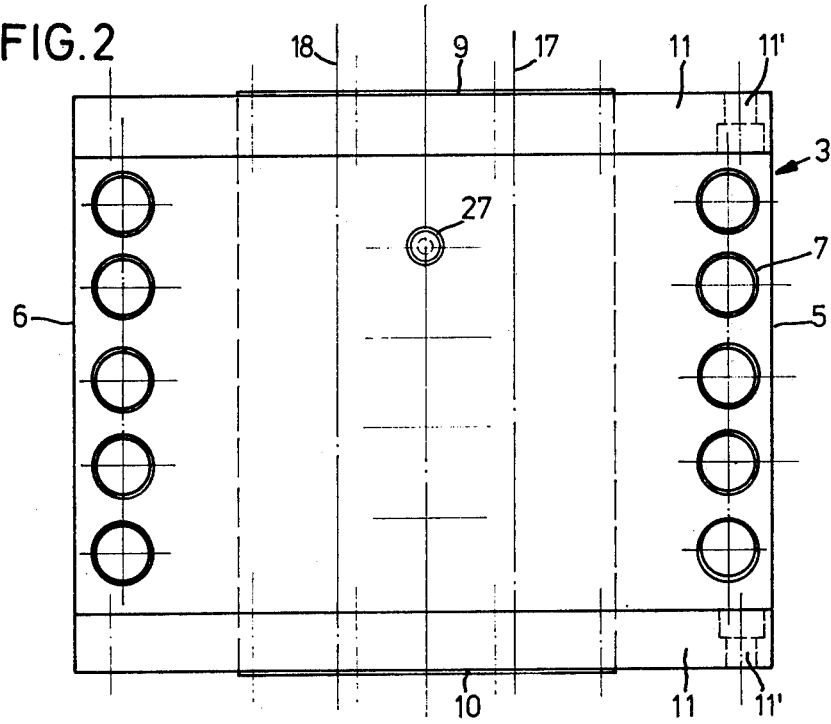
FIG. 2 is a plane view of the screw housing according to FIG. 1.
Figure 3:
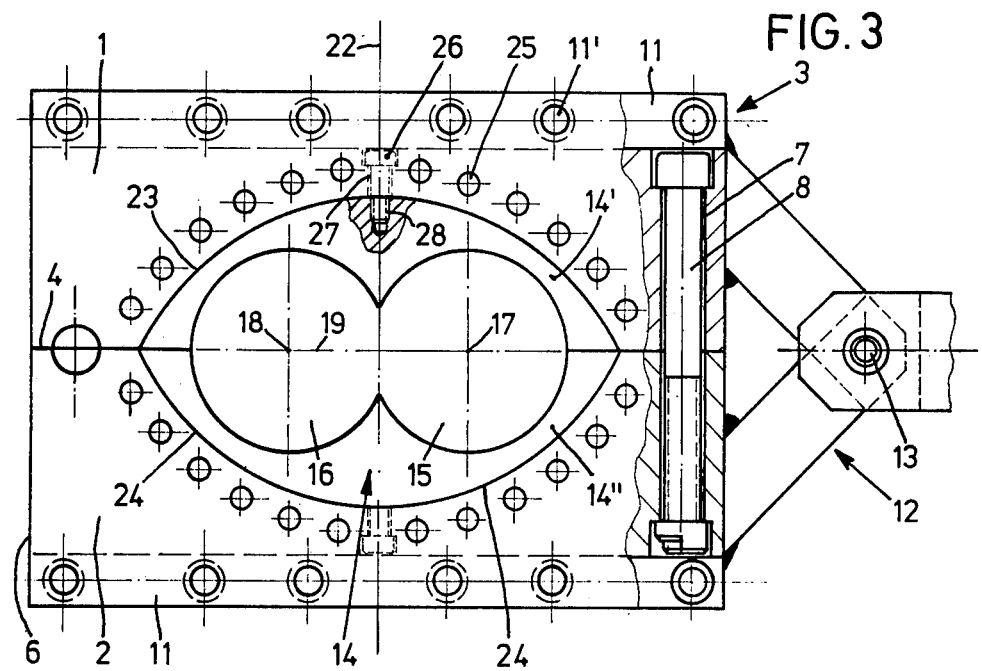
FIG. 3 is partly section transverse view of a screw similar to that shown in FIG. 1, with a divided wearing insert.
Figure 4:
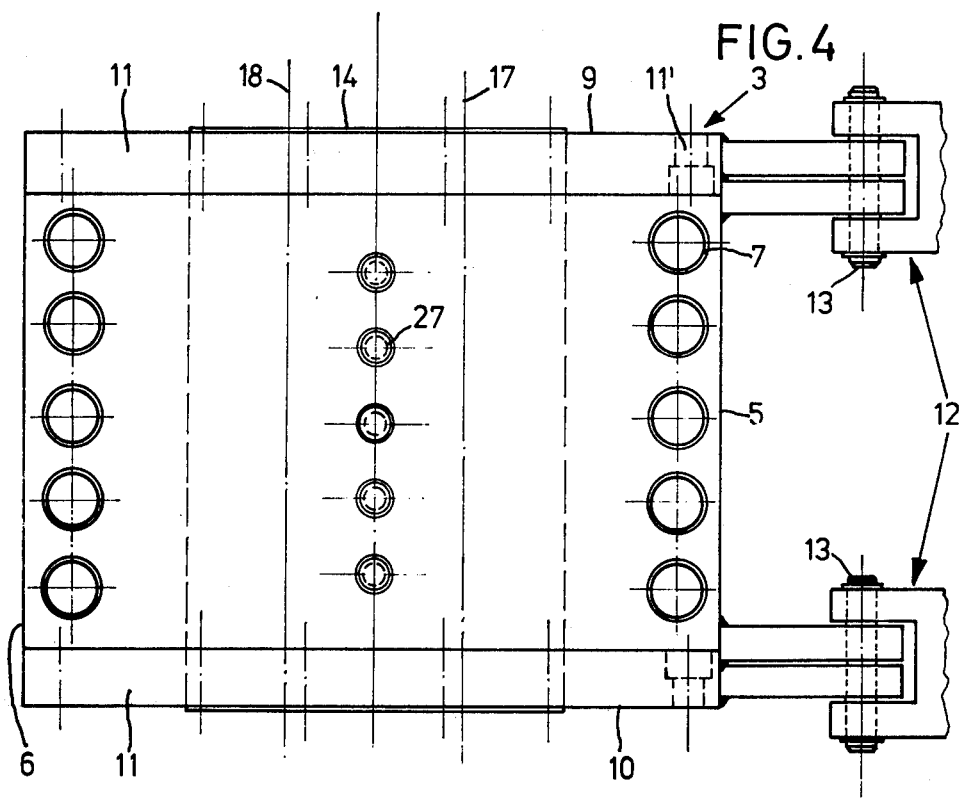
FIG. 4 is a plan to the screw housing according to FIG. 3.

The screw housing 3 of the embodiment according to FIGS. 3 and 4 differs from the screw housing of the embodiment according to FIGS. 1 and 2 only in that housing top section 1 and housing bottom section 2 are mutually connected by means of two articulated arms 12 pivotable about an axis 13, so that after releasing the tie rods 8, and of course any possible connections to adjacent housing sections, the housing top section 1 can be pivoted relatively to the housing bottom section 2.

In the screw housing 3 there is arranged a wearing insert 14 which has two cylindrical bores 15, 16 to accommodate two screw shafts. The longitudinal axes 17, 18 of the cylindrical bores 15, 16 extend mutually parallel to one another and lie in the horizontal median longitudinal plane 4 of the screw housing 3. In other words, these axes 17 and 18 lie in the division plane between housing top section 1 and housing bottom section 2. The distance A between these two longitudinal axes 17 and 18 is shorter than the diameter $Di$ of the two bores 15 and 16, which is the same for both bores, i.e., the cylindrical bores 15 and 16 are made to overlap in conformity with the mutual engagement of the screw shafts to be arranged in them. Dictated by this mutual penetration of the bores 15, 16, saddles 101, 102 are formed in the wearing insert. If, as might be required, the bores 15, 16 do not penetrate one another, but are joined together by means of preformations, then the saddles simply become somewhat wider.

The wearing insert 14 has a cross-section which is formed by two circular segments with the same center angle $\alpha$ and the same radius R. The secants 19 of these two circular segments lie in the horizontal median longitudinal plane 4 of the screw housing 3. The center axes 20, 21 of the circular segments extend parallel to the horizontal median longitudinal plane 4 in the vertical median longitudinal plane 22, which is simultaneously the second plane of symmetry for the wearing insert 14. The vertical distance $x$ of each center axis 20 or 21 from the horizontal median longitudinal plane 4 is defined by the following expression: $Di \geq X \geq Di/7$. For the embodiments described and illustrated, the center angle $\alpha$ is approximately 120°.

The wearing insert 14 is supported in the screw housing 3 in cavities 23 in the housing top section 1 and 24 in the housing bottom section 2. These cavities 23 and 24 each exhibit the cross-section of a circular segment which is identical with the corresponding circular segment cross-sections of the wearing insert.

Parallel to the envelope lines of the cavities 23 and 24, bores 25 for a cooling medium are arranged in the housing top section 1 and in the housing bottom section 2, the vertical distance of which from the cavity 23 or 24 may be very short.

Whereas the wearing insert 14 in the embodiment according to FIGS. 1 and 2 is constructed integrally — i.e., in one piece — in the embodiment according to FIGS. 3 and 4 it is constructed in two parts, comprising a top section 14' and a bottom section 14", while the division plane likewise lies in the horizontal median logitudinal plane 4 — i.e., in the principal plane of symmetry, of the wearing insert.

The wearing insert 14 is clamped and anchored in the screw housing 3 by fixing screws 26 acting as tie rods, which are arranged in bores 27 in the housing top section 1 and housing bottom section 12 respectively, and which engage in corresponding screw-threaded bores 28 in the wearing insert 14 or its top section 14' and bottom section 14". The bores 27 and 28, and hence the fixing screws 26, are located in the vertical median longitudinal plane 22 and are oriented perpendicularly to the horizontal median longitudinal plane 4, and therefore attack the reinforced saddle region. No radial, axial or tangential securing means of the wearing insert 14 (or 14', 14") is necessary owing to the above-described cross-sectional shape of the wearing insert and the associated cavities 23 and 24 in the screw housing 3.

Figure 5:
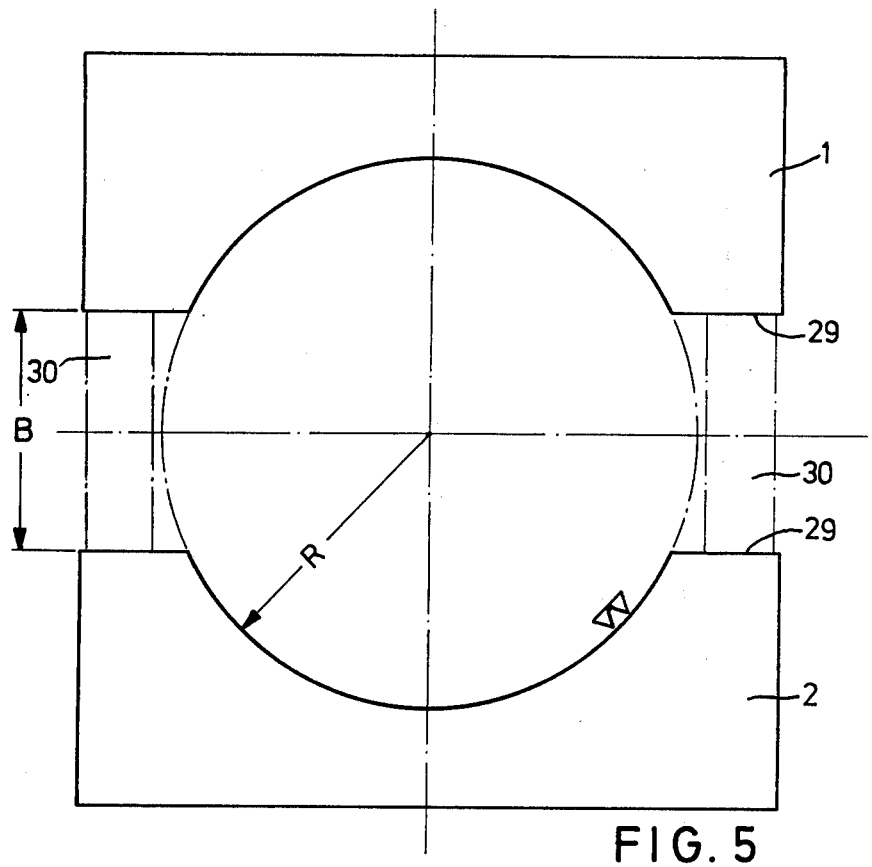
FIG. 5 is the housing top section and housing bottom section of a screw housing according to FIGS. 1 to 4 in an arrangement for manufacturing the cavities in the screw housing.
Figure 6:
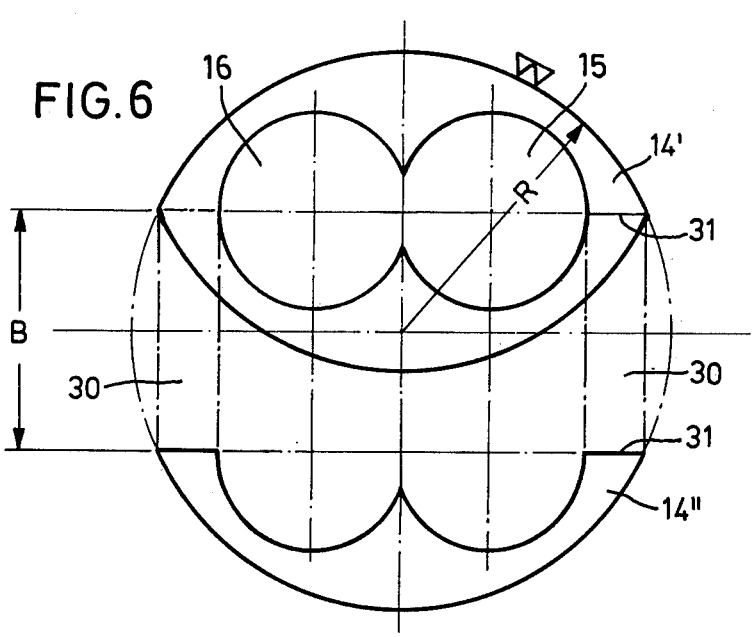
FIG. 6 is an integral and a divided wearing insert in their arrangement for manufacturing the external periphery.

The extraordinary simple mode of manufacturing and machining the cavitits 23 and 24 in the housing top section 1 and housing bottom section 2 of the screw housing is illustrated in FIG. 5. The two housing sections 1, 2 already machined plane parallel at their contacting surfaces 29, and which form the median longitudinal plane 4 in the finally assembled screw housing 3, are clamped on a lathe with inter-position of distance pieces 30. The length B of the distance pieces is presented by the formula: $B = 2x = 2R(1 - 2\sin^2 \alpha/4)$. Now if this arrangement is hollow turned with the radius R and optionally circular ground, then the cavities 23 and 24 are produced with extreme accuracy in the housing top section 1 and housing bottom section 2, in one work stage.

If the wearing insert 14 is constructed in two parts, i.e., to comprise a top section 14' and a bottom section 14", then the machining of the external circumference of the wearing insert is performed in basically the same manner, i.e., the wearing insert section 14' and 14" already machined plane parallel at their contact surfaces 31 which lie in the horizontal median longitudinal plane 4 upon subsequent assembly, and already provided with the corresponding bores 15 and 16, are arranged at a distance B from one another with distance pieces 30 and are then turned all around with the radius R and optionally circular ground. This possibility is illustrated at the top and bottom of FIG. 6. If on the other hand the wearing insert 14 is constructed integrally, as illustrated at the top in FIG. 6, then its external circumference must be manufactured by turning and optionally circular grinding in two work stages.

Figure 7:
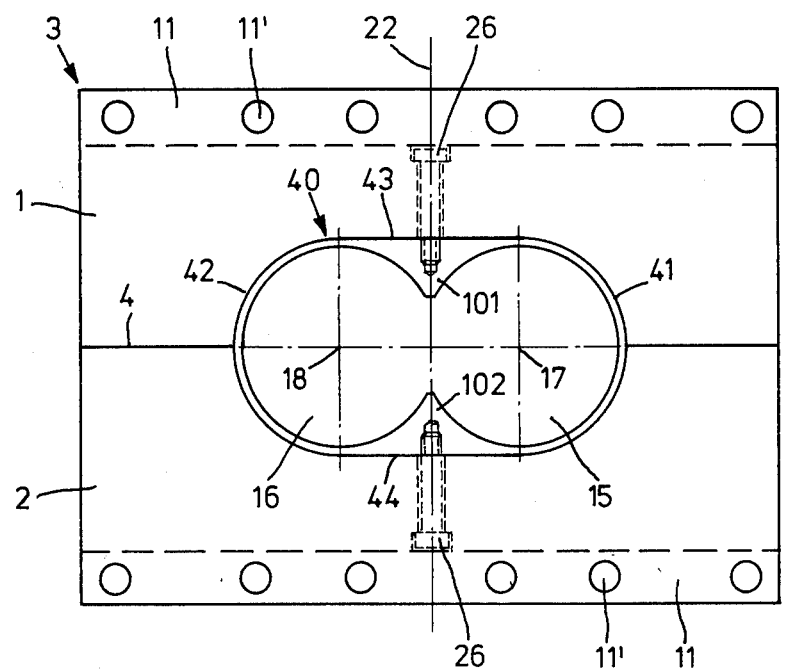
FIG. 7 is a transverse view of a further embodiment of a wearing insert according to the invention.

Another wearing insert 40 with a different external cross-section is illustrated in FIG. 7. When identical parts are provided as in the previously described embodiments, the same reference numerals are also employed. The wearing insert 40 exhibits an external cross-section which is formed by two semi-circles 41, 42 which are connected together tangentially by two straight lines 43, 44. As the drawing clearing shows, the wearing insert 40 is of extremely thin-walled construction in the region of the semi-circles and is reinforced only in the region of the saddles 101 and 102. This wearing insert 40 may also be divided in the horizontal median longitudinal plane 4.

Figure 8:
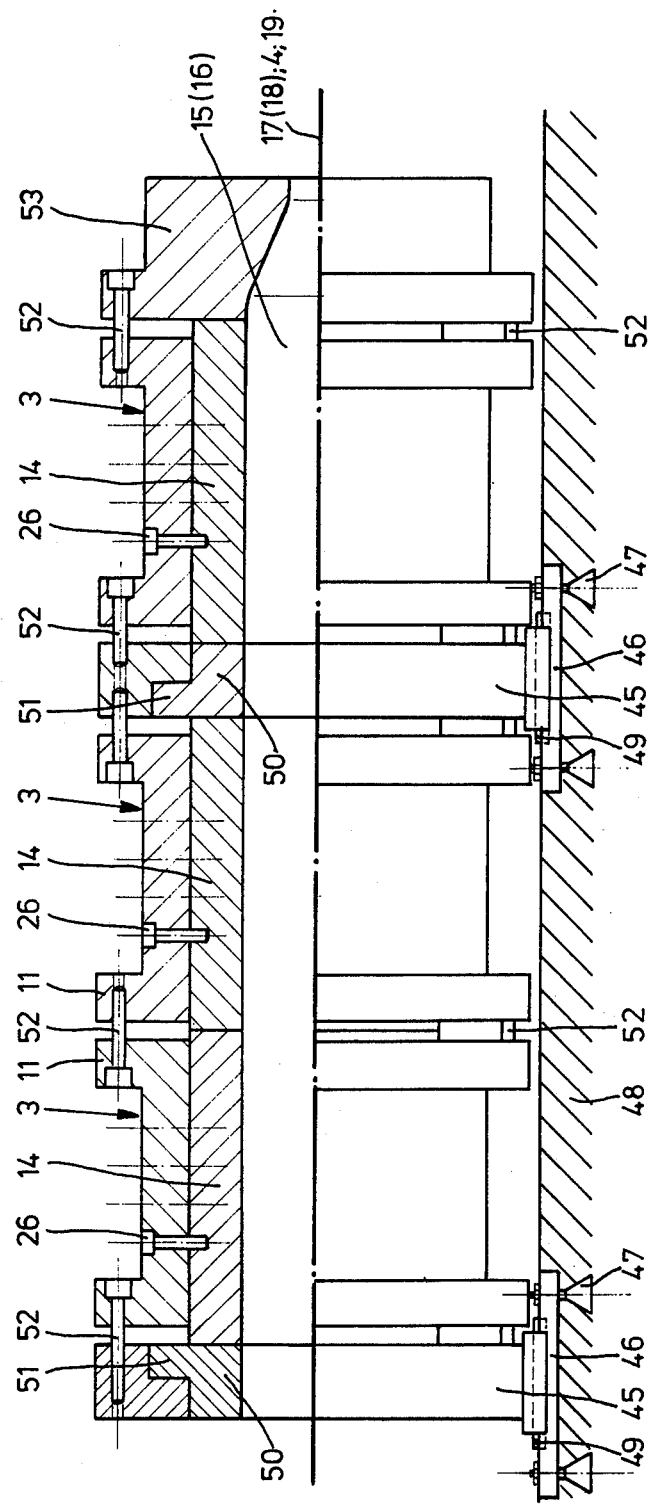
FIG. 8 is an arrangement of a plurality of consecutive screw housing with wearing inserts.

As may be seen from FIG. 8, a plurality of screw housings with wearing inserts 14 or 40 may be arranged mutually aligned in a row and be connected together. As will be seen, the wearing inserts 14 or 40 are conveniently somewhat longer than the respectively associated screw housing 3, so that the wearing inserts when exchanged need not be re-machined on their end faces.

The screw housings 3 (housing lengths) are compressed axially between two bracing and guiding plates 45. These bracing and guiding plates are braced against foundation plates 46 which are attached by means of tie rods 47 to the bottom foundation 48 of the machine. The bracing and guiding plates 45 are displaceable in the direction of the longitudinal axis of the machine 17, 18 through the intermediary of a key 49 arranged centrally on the respective foundation plate 46. Such an axial movement of the bracing and guiding plate occurs due to thermic expansions and to axial thrust or preloading of the individual housings 3 among themselves. Such an axial guidance is necessary in order that an accurate alignment of the individual housings 3 and of the wearing inserts present in them exists at all temperatures.

The bracing and guiding plates 45 are wither constructed integrally or else (conveniently) have separate short wearing inserts 50 corresponding to their axial length which are aligned with the other wearing inserts 14 and/or 40. These short wearing inserts 50 are each anchored axially counter to the stressing direction by a collar 51 in the associated bracing and guiding plate 45. The axial stressing of the screw housing 3 with the slideable bracing and guiding plates 45 is effected through the flanges 11 and corresponding tie rods 52. By uniform tightening of the screws 52, the wearing inserts 14 or 40 and 50 are pressed firmly together at their end faces, so that they become melt-tight at these points, i.e., melt produced in the interior of the bores 15, 16 by liquefaction of the material to be processed there cannot penetrate to the exterior. A discharge section 53 is screwed in the same manner to the foremost positioned screw housing 3, whereby the axial thrust towards the housing generated by the resistance of the discharge section 53 is transmitted to the axial bearings provided for the screw.

Materials which may be considered for the wearing inserts 14 or 40 or 50 include, e.g., cast materials, sintered materials, e.g., hard metals, through-hardened materials, carbon steels, tool steels, and high-speed steels.

While this device has been described in great detail, it should not be construed to be limited. It will be obvious to those skilled in the art that various changes may be made without departing from the scope of the invention, and the invention is not to be considered limited to what is shown in the drawings and described in the specification.

What is claimed is:

1. A screw housing with a non-circular wearing insert for a two-shafted screw machine, wherein the wearing insert has two spaced parallel bores to accommodate respective screw shafts, the mutually parallel longitudinal axes of the shafts lying in the principal plane of symmetry of the wearing insert, and being spaced apart to form saddles between the bores, the insert having substantially constant external cross-section along its axial length and being arranged in a cavity of the smae cross-section in the screw housing, the wearing insert having an external cross-section which is bounded exclusively by convex curves having different radial centers and which intersect along straight lines parallel to said longitudinal axes, while no angles are present in the curves in the region of the saddles and the insert is undivided in the region of the saddles.

2. A screw housing with a non-circular wearing insert for a two-shafted screw machine, wherein the wearing insert has two spaced parallel bores to accommodate respective screw shafts, the mutually parallel longitudinal axes of the shafts lying in the principal plane of symmetry of the wearing insert, and being spaced apart to form saddles between the bores, the insert having substantially constant external cross-section along its axial length and being arranged in a cavity of the same cross-section in the screw housing, the wearing insert having an external cross-section which is bounded exclusively by convex curves and respective straight curves which extend respectively from one of the convex curves to the next, while no angles are present in the curves in the region of the saddles and the insert is undivided in the region of the saddles.

3. A screw housing according to claim 2, wherein the external cross-section is formed by two semi-circles located with their respective centers on the longitudinal axes of the bores and two straight lines connecting these semi-circles tangentially.

4. A screw housing according to claim 2 wherein the housing is divided in its median longitudinal plane coincident with the principal plane of symmetry of the wearing insert, the two housing sections being detachably connected together.

5. A screw housing according to claim 4, wherein the housing sections are pivotably connected together.

6. A screw housing according to claim 4 wherein the wearing insert is detachably connected to the wall of the cavity by means of fixing screws in the secondary plane of symmetry extending perpendicularly to its principal plane of symmetry.

7. A screw housing with a non-circular insert for a two-shafted screw machine, wherein the wearing insert has two spaced parallel bores to accommodate respective screw shafts, the mutually parallel longitudinal axes of the shafts lying in the principal plane of symmetry of the wearing insert, and being spaced apart to form saddles between the bores, the insert having substantially constant external cross-section along its axial length and being arranged in a cavity of the same cross-section in the screw housing, the wearing insert having an external cross-section which is bounded by at least two convex curves, while no angles are present in the external cross-section in the region of the saddles and the insert is undivided in the region of the saddles.

8. A screw housing according to claim 7, wherein the wearing insert has an external cross-section which is formed by two circular segments of equal redius (R) and equal center angle ($\alpha$) in mutual contact by their secants, the center angle $\alpha$ being defined by $\alpha < 180°$.

9. A screw housing according to claim 8, wherein the distance $x$ of the centers of the circular arcs outwardly bounding the circular segments from the median longitudinal plane formed by the longitudinal axes of the screw bores is defined by the expression $Di \geq x \geq Di/7$, where $Di$ is the inside diameter of the screw bores.

10. A screw housing according to claim 8, wherein the length $S$ of the secants is defined by the expression $3\,Di \geq S \geq 1.7\,Di$, where $Di$ is the inside diameter of the screw bores.

* * * * *